United States Patent [19]

Takeda et al.

[11] Patent Number: 4,813,649
[45] Date of Patent: Mar. 21, 1989

[54] BALL VALVE

[75] Inventors: Shinji Takeda, Ohmiya; Mitsuharu Hashimoto, Sakado, both of Japan

[73] Assignee: Sekisui Kagaku Kogyo Kabushiki Kaisha, Osaka, Japan

[21] Appl. No.: 84,051

[22] Filed: Aug. 11, 1987

Related U.S. Application Data

[62] Division of Ser. No. 788,306, Oct. 17, 1985.

[30] Foreign Application Priority Data

Oct. 17, 1984 [JP] Japan .................................. 59-217515
Jul. 31, 1985 [JP] Japan .................................. 60-170310

[51] Int. Cl.⁴ .............................................. F16K 5/06
[52] U.S. Cl. .................................... 251/315; 251/316; 403/348
[58] Field of Search ................ 251/316, 315; 137/315; 403/348, 349

[56] References Cited

U.S. PATENT DOCUMENTS

| | | |
|---|---|---|
| 1,130,726 | 3/1915 | Greve . |
| 3,853,414 | 12/1974 | Hirano et al. ................... 403/349 X |
| 4,023,773 | 1/1976 | Wise . |
| 4,059,250 | 12/1975 | Guldener et al. . |
| 4,281,895 | 4/1979 | Mohr . |
| 4,327,895 | 8/1980 | Blumenkranz et al. . |
| 4,523,608 | 4/1982 | Miller . |
| 4,575,046 | 4/1984 | Krause et al. . |
| 4,605,202 | 10/1984 | Tsuno et al. . |

Primary Examiner—Martin P. Schwadron
Assistant Examiner—John C. Fox
Attorney, Agent, or Firm—Armstrong, Nikaido, Marmelstein & Kubovcik

[57] ABSTRACT

A ball valve is provided which comprises a valve body formed from a tubular member with a cylindrical hole extending therethrough, a stem having one end thereof projecting into the hole, and a ball fixed to an end of the stem. The ball has a circular bore extending diametrically therethrough, wherein the ball is spherical in shape with removed chordal segments corresponding to the bore. A seat carrier is inserted in the hole, the seat carrier having one end adjacent the ball, a connecting sleeve contacts the seat carrier at the other end thereof opposite the end adjacent the ball, and a union nut couples the connecting sleeve to the valve body. Diametrically opposed projections are provided on the inner surface of the valve body, the projections extending into the hole, recesses formed on the side of the seat carrier adjacent the one end thereof, and diametrically opposed grooves are formed in the side of the seat carrier adjacent the recesses. The grooves extend in the circumferential direction from the adjacent recesses. When the seat carrier is inserted into the valve body and rotated therein, the projections on the valve body engage the grooves in the seat carrier to thereby hold the seat carrier in the valve body. Further, a flange is formed on the other end of the seat carrier wherein one of the flange and valve body includes at least one projection and the other of the flange and valve body includes at least one cavity. The projection is engaged in the cavity to prevent the rotation of the seat carrier with respect to the valve body.

3 Claims, 7 Drawing Sheets

BALL VALVE

This is a continuation, of application Ser. No. 788,306 filed Oct. 17, 1985.

BACKGROUND OF THE INVENTION

1. Field of the Invention

This invention relates to a ball valve, and more particularly, to a ball valve comprising a valve body, a ball set in the valve body and a seat carrier located on at least one side of the ball, in the valve body, to carry a seat to hold the ball in position within the valve body. The seat carrier is detachably fixed in the valve body.

2. Description of the Prior Art

Ball valves are already known in the prior art. The known ball valves comprise of valve body, a stem, a ball, seats, a pair of seat carriers, connecting sleeves and union nuts. The valve body has a cylindrical hole extending therethrough which forms the valve chamber. The stem extends laterally into the central portion of the valve body, with one end thereof projecting into the valve chamber. The ball has a bore diametrically extending therethrough and is inserted in the valve chamber and engages the end of the stem such that it is rotatably held in the valve chamber. The ball must be able to be inserted into the valve body for assembling, and for this purpose the ball has a groove on the top thereof to receive and engage the end of the stem. Thus, the ball can be removed from the valve body when the ball is turned sideways, that is, in the state when the bore crosses the valve chamber in the valve body i.e., in the closed position.

A seat carrier is located on at least one side of the ball and, usually two seat carriers are located one on each side of the ball. The seat carrier is provided with a ball seat on the end facing to the ball in close contact with the ball to set the ball in position and to allow the ball to rotate freely. If the ball seat is abraded by the rotation of the ball, after a period of use and a gap may be formed between the ball seat and the ball. The seat carrier is designed to be able to move towards the ball in the valve body to eliminate the gap. Thus, most of the conventional ball valves have not been designed to firmly secure the seat carrier to the valve body.

In order to prevent the seat carrier from moving out of the valve body, a connecting sleeve is provided in contact with the seat carrier and joined to the valve body by a union nut. Thus the ball seat is pressed against the ball via the seat carrier and the connecting sleeve by the force exerted by the union nut and this prevents the ball from coming out of the valve body. Therefore, if the ball seat is worn, it gives rise to play between the ball and the seat, and then the union nut must be further rotated to advance the connecting sleeve inwardly to bring the ball seat into close contact with the ball.

The above described ball valve, however, has serious drawbacks in that the union nut joined on the down side of the valve cannot be removed from the valve body while fluid pressure is being maintained More particularly, it is sometimes required that a pipe connected on the downstream of the valve be replaced or repaired while the valve is in use. In such cases, the valve is closed and the union nut on the downstream side is removed, the ball however, comes out of the valve body together with the seat carrier because of the fluid pressure in the line, and hence it may result in bodily injury and/or a great deal of fluid flowing out of the line. These drawbacks result from the necessity that the seat carrier must be movable in the valve body in the axial direction thereof and that the ball, when turned sideways, i.e., in the closed position, must be detachable from the stem in order that the valve can be assembled.

In order to overcome the above drawbacks, U.S. Pat. No. 4,059,250 suggests that the seat carrier be directly fixed to the valve body. This is accomplished using a bayonet means, wherein the seat carriers are provided with partial projections on the outer surface thereof, and the valve body, at each end thereof, is provided with recesses and grooves on the inner wall surface thereof. The projections are inserted into the recesses and then set in the grooves. More particularly, the seat carriers are provided with the projections, that is dogs, on the outer surface at one end thereof and, the valve body is cut-away from both ends towards the inner portion thereof to form recesses and grooves on the inner wall surface thereof and to form lips on the remaining surface. The projections are mated with the recesses, and the seat carriers are inserted into the valve body and then rotated to fit the projections in the grooves. Thus by engaging the projections with the lips, the seat carriers are fixed to the valve body.

Using the bayonet means, the seat carriers are fixed to the valve body immediately after having been inserted and rotated. However, sometimes the seat carriers are rotated back and as a result, the seat carrier may come out of the valve body. Thus, U.S. Pat. No. 4,059,250 suggests that a wedge be inserted between the seat carrier and the valve body to prevent the seat carrier from rotating back in the valve body.

The formation of the grooves in the valve body, as suggested by the U.S. Pat. No. 4,059,250, however, has the disadvantage that the thickness of the valve body is partially reduced and this results in a decrease in strength or pressure resistance. Thus, in order to maintain the original pressure resistance, the thickness of the entire valve body must be increased, which results in the disadvantage that the valve, as a whole, increases in weight and further, the cost of manufacturing is increased. In spite of the apparent disadvantages, U.S. Pat. No. 4,059,250 suggests the formation of the grooves in the valve body, and this is due to the thought that there is no other way for fixing the seat carrier to the valve body. In other words, the prior art patent is based on the idea that, if projections are provided on the inner surface of the valve body, the projections would hinder insertion of the ball when the valve is to be assembled, and that the grooves should be formed on the valve body in order to avoid the hindrance to the insertion. The present invention aims to overcome this problem in the prior art.

Further, in U.S. Pat. No. 4,059,250, the insertion of the wedge between the seat carrier and the valve body also has disadvantages. In particular, the wedge is small and may be lost when the valve is disassembled or forgotten when the valve is assembled. When the used valve is to be repaired, most workers who assemble the valve do not know particular structures of the valve and they are liable to fail to insert the wedge in the valve. Furthermore, the wedge is very small and thus it is difficult to insert. If the wedge is not inserted, the seat carrier may rotate backwards when the union nut is removed, and the seat carrier may come out of the valve body and simultaneously the ball may come out. The present invention eliminates these disadvantages.

SUMMARY OF THE INVENTION

It is the primary object of the present invention to fix a seat carrier in a valve body so that a pipe connected to the valve may be removed from the valve body without allowing the seat carrier, together with the ball, to come out of the valve body while the fluid pressure is applied to the valve.

Another object of the present invention is to enable the valve body to removably retain the seat carrier therein without decreasing the thickness of the valve body and accordingly, without decreasing strength or pressure resistance of the valve body.

The present invention makes it possible to fix the ball carrier to the valve body without hindering insertion of the ball, by providing projections on the inner wall surface of the valve body. In particular, the ball originally has the shape of a sphere, but when a bore is made in the ball, the ball has a shape in which the sphere is symmetrically cut-away on both sides as a result of the bore or circular flow passage which extends diametrically therethrough. When the ball is viewed in the axial direction of the valve body at the time of being inserted in the valve body, the ball has cut-away portions comprising chordal segments on both sides. Thus, if the projections are formed on the inner surface of the valve body within the range of the chordal segments, the projections can be used to fix the seat carrier to the valve body without hindering insertion of the ball. In the present invention, therefore, the projections are formed on the inner surface of the valve body, and the projections are restricted within the range of the chordal segments, each of which has a chord extending parallel to the stem axis and has a length approximately equal to the diameter of the bore in the ball. It may be defined more precisely that each of the chordal segments is, in the cross-section of the valve body, an arched area surrounded by the circle indicating the inner surface of the valve body and by a chord extending parallel to the stem axis and passing two points at which the circle indicating the contour of the ball intersects with two straight lines which are tangents of a circle having the diameter of the bore in the ball and perpendicular to the stem axis. Further, the seat carrier is partly cut-away on the outer surface thereof, and the cut-away portions are located at diametrically opposed positions, extended slightly in the axial direction of the seat carrier to form recesses and to form grooves extending in the circumferential direction. The seat carrier is inserted in the valve body, then while the projections of the valve body are positioned in the recesses of the seat carrier, the seat carrier is further advanced in the valve body, thereafter the seat carrier is rotated to fit or engage the projections in the grooves, and thus, the seat carrier is fixed to the valve body.

According to a first embodiment of the present invention, a ball valve comprises a tubular valve body with a cylindrical hole extending therethrough, a stem with an end thereof projecting into the hole, and a ball having a circular bore diametrically extending therethrough, inserted in the hole and rotatably fixed to the end of the stem. A seat carrier is positioned in the hole to the side of the ball, a connecting sleeve is in contact with the ball carrier, and a union nut joins the connecting sleeve to the valve body. The valve is characterized by having projections on the inner surface of the valve body in the area adjacent the inner end of the seat carrier. The projections are opposed to each other on a diameter perpendicular to the stem axis. The outer surface of the seat carrier is partially cut around diametrically opposite portions starting at one end to form recesses and grooves. Each of the recesses start from the end and advances in the axial direction to connect with the groove extending in the circumferential direction of the seat carrier. The seat carrier is inserted starting with the one end with each of the projections positioned in a corresponding recess and the seat carrier is then rotated to engage the projections in the grooves to thereby fix the seat carrier in the valve body.

According to a second embodiment of the present invention, a ball valve comprises a valve body, stem, ball, ball seat(s), seat carrier(s), connecting sleeve(s), and union nut(s) as mentioned above. The valve is characterized by a flange on the seat carrier, the flange facing an end surface of the valve body, and a rotation preventing means, i.e., locking means, between the end surface of the valve body and the flange surface facing the end surface of the valve body to prevent rotation of the seat carrier. More particularly, the rotation preventing means comprises projections on one of opposing surfaces of the seat carrier and valve body and a corresponding cavity or indent on the other opposing surface. The projection fits into the cavity or indent to prevent the seat carrier from rotating in the valve body after the seat carrier has been inserted and fixed in the valve body. In this embodiment, the mechanism for fixing the seat carrier in position within the valve body is not limited to one in which the valve body is provided with projections and the seat carrier is provided with corresponding recesses or grooves, but may be a ball valve in which, the valve body is provided with recesses or grooves and the seat carrier with the corresponding projections.

In the first embodiment, since the projections are on the inner wall surface of the valve body at positions which are opposed to each other on a diameter perpendicular to the stem axis, the projections are within the cut-off, chordal segment portions of the ball formed by making the diametric bore in the ball. Thus, when the ball is to be inserted in the valve body the projections do not hinder insertion of the ball. Further, the projections are formed on the inner surface of the valve body which contacts the seat carrier, and the recesses and grooves are formed on the outer surface of the seat carrier and around opposite portions on a diameter of the seat carrier such that the recesses start from the forward end of the seat carrier and advance in the axial direction thereof, and the grooves are connected to each of the recesses and advance in the circumferential direction. Thus by mating the recesses with the projections, the seat carrier can be inserted into the valve body beyond the projections. Furthermore, the grooves are connected to the recesses and extend in the circumferential direction, and therefore, by rotating the seat carrier in the valve body, the seat carrier can be fixed in the valve body so that the seat carrier does not come out of the valve body. Thereafter, the connecting sleeve is applied to the end of the seat carrier, and it is coupled to the valve body by the union nut.

According to the second embodiment, since the projections are formed on one of the contacting surfaces between the seat carrier and valve body, while the recesses and grooves are formed on the other surface, wherein the recesses start from the inner end of the surface and advance along the surface in the axial direction, and the grooves are connected with the recesses and advance in the circumferential direction, by mating the projections with the recesses, the seat carrier can be inserted into the valve body beyond the projections, and then by rotating the seat carrier to advance the projections in the grooves, the seat carrier can be fixed in the valve body. Preferably the side surface of the projections or grooves is slightly inclined in a spiral form, so the seat carrier can be readily advanced deeply into the valve body as it is rotated. Moreover, when the groove width is made slightly larger than the projection width, the projections will have play in the grooves and the seat carrier can be slightly moved in the valve body in the axial direction thereof. Furthermore, since the seat carrier is provided with the flange at the rear end in the axial direction thereof, the flange is opposed to the end surface of the valve body. One of the opposite surfaces of the flange and the valve body is provided with a projection and the other surface is provided with a cavity or indent. Thus if the seat carrier is rotated to fit the projection into the cavity or indent after the seat carrier has been fixed in the valve body, the seat carrier is prevented from rotating backwards or reversely in the valve body and thus from coming out of the valve body.

BRIEF DESCRIPTION OF THE DRAWINGS

FIGS. 1–7 illustrate a first embodiment of the ball valve according to the first embodiment of the present invention.

FIGS. 8–18 show an embodiment of the ball valve according to a second embodiment of the present invention, wherein the ball valve is provided with a backward rotation preventing means.

FIGS. 19–25 show a third embodiment of the ball valve of the present invention, wherein the ball valve is provided with a backwards rotation preventing means.

DETAILED DESCRIPTION OF THE PREFERRED EMBODIMENTS

In FIGS. 1–7, valve body 1 has a cylindrical hole extending therethrough, which forms a valve chamber. A stem 3 laterally extends into valve body 1 with one end projecting into the hole of the valve body 1. Stem 3 can be rotated in the valve body.

Figure 1:
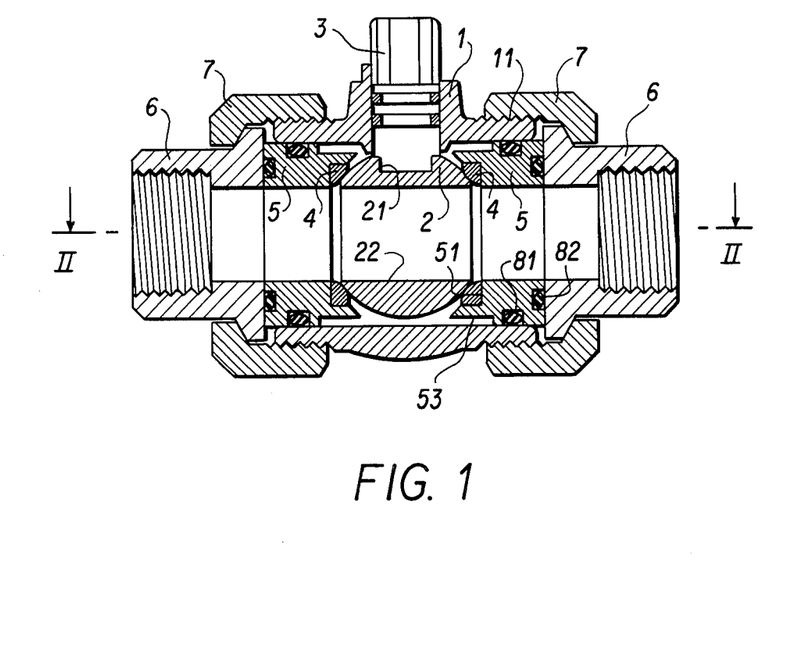
FIG. 1 is a vertical cross-sectional view of the ball valve.
Figure 2:
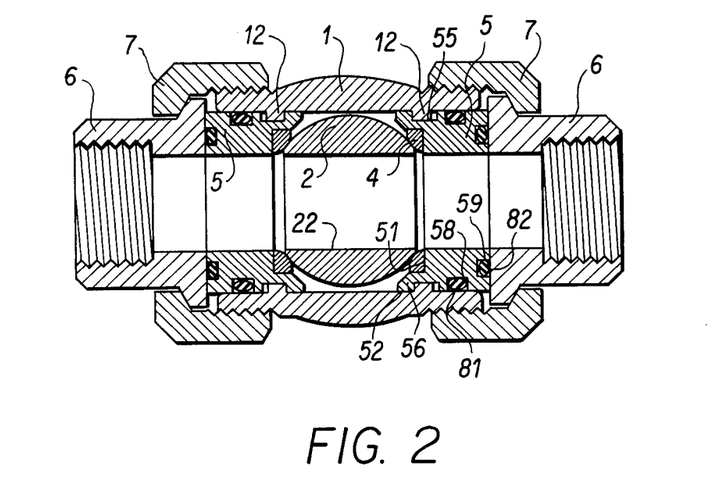
FIG. 2 is a horizontal cross-sectional view of the valve along II—II line in FIG. 1.
Figure 3:
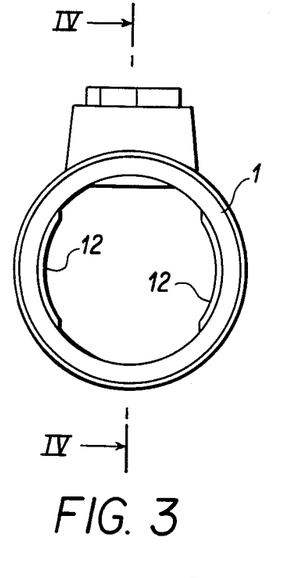
FIG. 3 is a side view of the valve body of the ball valve.
Figure 4:
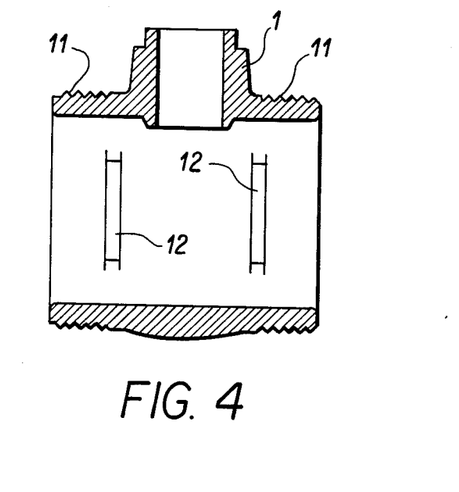
FIG. 4 is a cross-sectional view of the valve body along IV—IV line in FIG. 3.

A spherical ball 2 has a circular bore extending diametrically therethrough, and is inserted in the hole of the valve body 1. Ball 2 is partly cut at the top thereof to form a groove 21, which extends in a direction perpendicular to the axis of the bore. Therefore, when ball 2 is inserted in the hole with the bore extending in a direction perpendicular to the axial direction of the valve body 1, groove 21 can receive the end of stem 3 and the ball 2 is secured to the stem 3. Thus, when the bore intersects perpendicularly with the hole, ball 2 can be engaged with or removed from the stem 3, and when ball 2 is engaged with stem 3, ball 2 is secured to stem 3 and can be rotated as desired.

Projections 12 are formed on the inner surface of valve body 1. In particular, projections 12 are formed on the surface which contacts the seat carrier 5 and are opposed to each other on a diameter perpendicular to the axis of stem 3. Projections 12 extend in the circumferential direction of valve body 1, and the extension in the circumferential direction and height in the radial direction should be within the range of the chordal segments formed by the diametrically cut-off portions of ball 2, when the ball 2 is viewed perpendicularly to the axis of the bore. Further, the thickness of projections 12 should be appropriately determined from the view-point that projections 12 should have a strength which can hold seat carrier 5 in the valve body against the fluid pressure therein.

Figure 5:
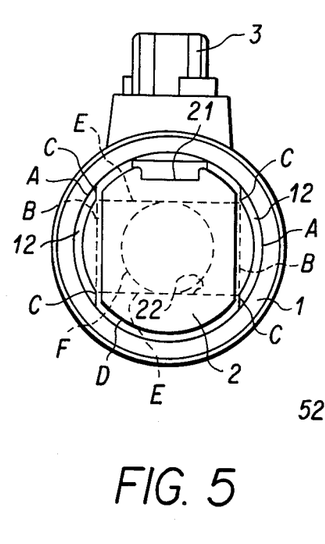
FIG. 5 is a side view of the valve body in FIGS. 3 and 4, with a stem and ball.

The chordal segments may be defined as, in cross-section of the valve body 1 shown in FIG. 5, as an area surrounded by the circle (A) indicating the inner surface of the valve body 1 and by respective chords (B) extending parallel to the axis of stem 3 and passing two points (C) at which the circle (D) indicating the contour of ball 2 intersects with two straight lines (E) indicating the contour in the longitudinal direction of the bore in ball 2. The straight lines (E) may be viewed as lines which are tangents to the circle (F) having the diameter of the bore in ball 2 and perpendicular to the axis of stem 3.

Seat carrier 5 has a generally tubular form and is located on both sides of ball 2. Seat carrier 5 is provided with ball seat 4 at a portion facing to ball 2. For this purpose, seat carrier 5 is cut-away on the end surface facing the ball 2 to form an annular recess 51, which is formed by a cylindrical surface parallel to the inner surface of seat carrier 5 and by a flat surface perpendicular to the axis of seat carrier 5. Thus the cylindrical surface and the flat surface are an L-form in cross-section. Ball seat 4 is fitted in the annular recess 51, and a portion of the ball seat 4 closely contacts the ball 2. Ball seat 4 is usually made of a fluorine resin and integrally molded in an annular form. Ball seat 4 has an inner diameter substantially equal to that of the bore in ball 2.

Seat carrier 5 is inserted into valve body 1 with a small gap therebetween and is movable axially in valve body 1. However, the gap is very small and the cylindrical outer surface of seat carrier 5 is close to the inner surface of the valve body 1. Seat carrier 5 has a cylindrical hole extending therethrough in the longitudinal direction, the diameter of which is substantially equal to the diameter of the bore in ball 2. Seat carrier 5 is provided with ball seat 4 on the inner end facing ball 2 as noted above, and the opposite or outer end of the seat carrier 5 protrudes slightly from the end of the valve body 1. The opposite end surface is provided with an annular groove 59, and an O-ring 82 is positioned in the groove 59.

Figure 6:
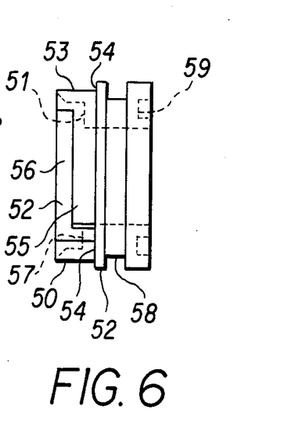
FIG. 6 is a plan view of a seat carrier.
Figure 7:
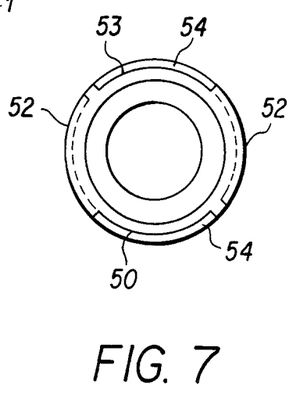
FIG. 7 a side view thereof.
Figure 8:
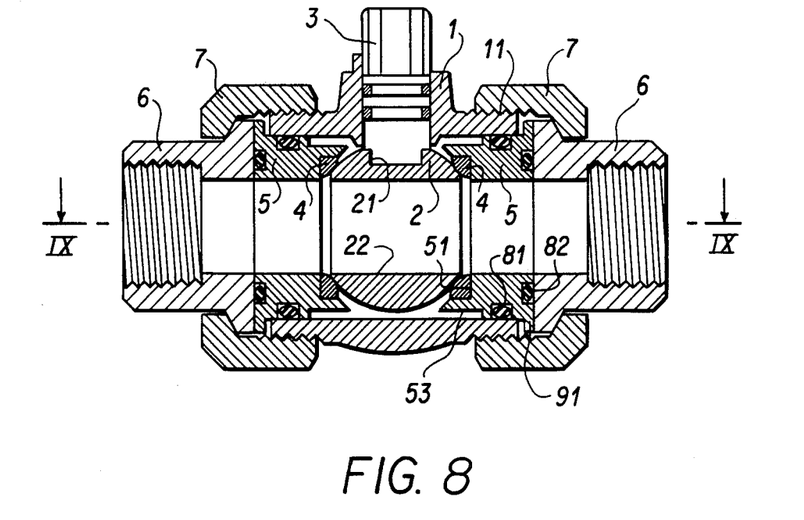
FIG. 8 is a vertical cross-sectional view of the ball valve.

In order to fix seat carrier 5 within the valve body 1, i.e. for blocking, as shown in FIG. 6, seat carrier 5 is provided with dogs 56 on the outer cylindrical surface thereof at an end portion close to ball 2. Dogs 56 are formed as seen in FIGS. 6 and 7, by partly cutting the outer portion of the end of seat carrier 5, which portion originally had a cylindrical surface close to the inner surface of the valve body 1, to form a pair of diametrical recesses and grooves connected with the recesses and extending in the circumferential direction of the seat carrier. More particularly, the recesses 50 are provided in diametrically opposed positions. Grooves 55 are formed at the forward end of each of the recesses 50 and extend in the circumferential direction. The recesses 50 can extend within a certain range in the circumferential direction. The range is greater than the extent of projections 12 formed on the valve body 1. Grooves 55 can also extend in the circumferential direction until the grooves are connected to each other to form an annular groove, however, the grooves are preferably not connected to each other. The width of grooves 55, that is in the axial direction of the seat carrier 5, should be slightly larger than the width of projections 12 in the axial direction of the valve body 1. As a result of the recesses 50, grooves 55, and dogs 56 are formed in the outer surface of seat carrier 5 such that the outer surface of seat carrier 5 comprises a small diameter portion 53 consisting of the recesses 50 and grooves 55, and a large diameter portion 52 consisting of the remainder, including dogs 56. Further, another annular groove 58 is formed on the large diameter portion 52 and is separated from the grooves 55. O-ring 81 is fitted into groove 58.

After ball 2 has been fixed to stem 3, seat carrier 5 is inserted in the valve body 1 with ball seat 4 facing the ball 2. When seat carrier 5 is inserted in valve body 1, it is maintained so that the recesses 50 on seat carrier 5 are aligned with projections 12 in the valve body 1, such that seat carrier 5 can advance deeply into the valve body such that dogs 56 move inwardly beyond projections 12 until ball seat 4 contacts ball 2. Thereafter seat carrier 5 is rotated to advance projections 12 in grooves 55, and as a result, dogs 56 are held by the projections 12, so that seat carrier 5 cannot be pulled out of the valve body 1. When the width of the projections 12 is less than the width of grooves 55, the projections 12 can be biased in grooves 55 to provide play, and thereby seat carrier 5 can be advantageously advanced to compensate for a gap caused by abrasion of ball seat 4.

Seat carrier 5 is thus fixed in valve body 1, positioned on both sides of ball 2, with ball seat 4 closely contacting ball 2, while allowing ball 2 to rotate freely around the center thereof. Further, seat carrier 5 has annular groove 58 on the outer surface thereof, and the groove 58 receives O-ring 81, which prevents the fluid from leaking between seat carrier 5 and valve body 1.

The outer end surface of seat carrier 5 extends slightly beyond the end surface of valve body 1. Connecting sleeve 6 contacts the extended end surface of seat carrier 5. In order to prevent leakage of the fluid, the extended end surface is provided with annular groove 59 for receiving O-ring 82. Connecting sleeve 6 has a flange on the end thereof which contacts seat carrier 5. Union nut 7 covers the flange and joins the connecting sleeve 6 to the end of valve body 1 by means of thread 11 provided on the outer surface at the end of the valve body 1. Since the seat carrier 5 is fixed in valve body 1 with the outer end surface extending from the end surface of valve body 1, projections 12 can be biased toward ball 2 in grooves 55 so as to have an outward play, and seat carrier 5 can be advanced inwardly towards ball 2 without difficulty by further tightening union nut 7. As a result, seat carrier 5 and seat 4 are always maintained in close contact with ball 2.

According to the present invention, the ball valve illustrated in FIGS. 1–8, can be readily assembled and disassembled, notwithstanding projections 12 formed on the inner surface of the valve body. On assembling, stem 3 is first turned to a position to shut the valve chamber in valve body 1, then ball 2 is inserted in the valve chamber with the bore 22 turned sideways, and ball 2 is advanced inwardly beyond projections 12 to just below stem 3. Since ball 2 has chordal segments cut-away on both sides thereof due to circular bore 22 which extends diametrically therethrough, the projections 12 formed on the inner surface of the valve body are within the chordal segments of ball 2. Thus, ball 2 can be connected with stem 3 in the same manner as in conventional ball valves.

Thereafter, seat carrier 5 is inserted in valve body 1 by aligning the recesses of the seat carrier with projections 12 of the valve body 1, and seat carrier 5 is then rotated in valve body 1 to move projections 12 into grooves 55, such that seat carrier 5 is fixed in valve body 1. Connecting sleeve 6 is then attached to the outer end surface of seat carrier 5 with the flange of connecting sleeve 6 abutting against the end surface of ball carrier 5. The flange is covered with union nut 7, which is then engaged with valve body 1, and thereby connecting sleeve 6 is joined to valve body 1. Further, leakage can be prevented by further tightening union nut 7 to advance ball carrier 5 inwardly.

The ball valve is thus assembled and the assembled valve can be disassembled without difficulty by conducting the above steps in the reverse order. On disassembling, the ball 2 is first turned to closed position, then union nut 7 is removed from valve body 1. Seat carrier 5 does not come out, but remains fixed in the valve body 1, and therefore, the connecting sleeve can be removed or replaced, which permits other connected pipes to be repaired or replaced without cutting off upstream pressure and fluid. Even if union nut 7 is taken off and connecting sleeve 6 is removed while the fluid pressure is being applied in the valve, seat carrier 5 still remains fixed in the valve body 1. When the fluid pressure is not applied in the valve, seat carrier 5 can be readily taken out by rotating it and moving dogs 56 out of engagement with projections 12. After seat carrier 5 has thus been removed, ball 2 can be readily taken out from valve body 1, and thus the ball valve can be disassembled without difficulty.

The above valve can be made of a metal or a hard synthetic resin. Among the synthetic resins, a thermoplastic synthetic resin, especially a hard vinyl chloride resin is preferable. When a thermoplastic synthetic resin is used, it is preferable to use an injection molding process for preparing the valve. The O-ring, however, is preferably made of a resilient material such as natural or synthetic rubber. The ball valve according to the first embodiment of the present invention is superior to a conventional ball valve in that the ball valve is manufactured with ease and will not give rise to leakage of fluid. For example, the ball valve according to the disclosures in U.S. Pat. No. 4,059,250, requires a complicated mold for manufacturing, because the valve body must be provided with recesses and grooves in the vicinity of both ends, and accordingly, the mold for manufacturing the valve body must be provided with mold cores having special portions, the outer diameters of which are reduced when the mold core is to be removed. In contrast, the ball valve according to the present invention can be manufactured by means of a simple mold, because the valve body is provided with only partial projections at inner portions thereof, and accordingly, it is sufficient if only the mold core is provided with a central portion, the outer diameter of which can be reduced when removed. As a result, molding operations of the present invention becomes simple compared with those in the above prior art U.S. patent. Further, the mold portion, the outer diameter of which must be reduced when the mold is to be removed from a molded article, is generally liable to produce fins in a groove. The fins extend in the width direction of the groove and stand on the inner surface of the groove, because in order to form the groove it is necessary for the mold portion to have abutting lines extending in the width direction of the groove. The groove is thus liable to give rise to fluid leakage, especially, when the groove is positioned in the vicinity of the ends. In the prior art, the fins in the groove were removed by a subsequent cutting operation, and the manufacturing operations were difficult. In contrast, according to the present invention, the valve body does not contain any grooves and is liable to produce fins only in the central portions located between the projections in the valve body, and accordingly, a good valve can be readily obtained which will not produce the fluid leakage and which does not require a subsequent cutting operation.

According to the present invention, a ball valve comprises a tubular valve body with a cylindrical hole extending therethrough, a stem with an end thereof projecting into the hole, and a ball having a circular bore diametrically extending therethrough and inserted in the hole and fixed rotatably to the end of the stem. A seat carrier is inserted in the hole and situated to the side of the ball, a connecting sleeve contacts the seat carrier, and a union nut joins the connecting sleeve to the valve body. The valve body is provided with the projections on the inner surface thereof opposed to each other on a diameter perpendicular to the stem axis. The projections do not hinder the ball passing through the hole in the valve body either when the ball is to be inserted or when to be removed. The seat carrier is partly cut on the outer surface around diametrically opposite portions on one end thereof to form recesses, each of which starts from the end and advances in the axial direction of the seat carrier. The seat carrier can be inserted without difficulty in the hole of the valve body by advancing the seat carrier with the recesses thereof are aligned with the projections of the valve body. Further, on the outer surface of the seat carrier, grooves are formed at the forward end of each of the recesses which extend in the circumferential direction, and therefore, the seat carrier can be fixed in the valve body by rotating the seat carrier in the circumferential direction to bring the projections of the valve body into the grooves of the seat carrier. As a result, the seat carrier does not come out of the valve body if the union nut is removed without stopping the fluid under pressure in the valve, and the connecting sleeve can be removed to repair a connected pipe. Furthermore, since the valve body is not provided with any recessed portion such as a groove, but simply provided with the projections on the inner surface thereof, the valve body is not decreased in pressure resistance or strength, and therefore, has a sufficient pressure resistance without increasing the thickness and weight of the valve body. Furthermore, when the valve body is made of a synthetic resin with injection molding, the mold for preparing the valve body can be simplified and the valve body can be manufactured with ease and at moderate prices. The present invention brings about these advantages.

Turning now to the second embodiment, another improved ball valve is explained hereinbelow referring to FIGS. 8-18. The ball valve shown in FIGS. 8-18 is distinguished from the ball valve in FIGS. 1-7 only in that the sea carrier 5 is additionally provided with flange 91 at the end protruding from the valve body, and the flange 91 can be fixed to the opposing end surface of the valve body. In other respects, the ball valve in FIGS. 8-18 is the same as that in FIGS. 1-7, and the same reference numbers are given to the corresponding portion in FIGS. 8-18, so that detailed explanations are omitted herein.

Figure 9:
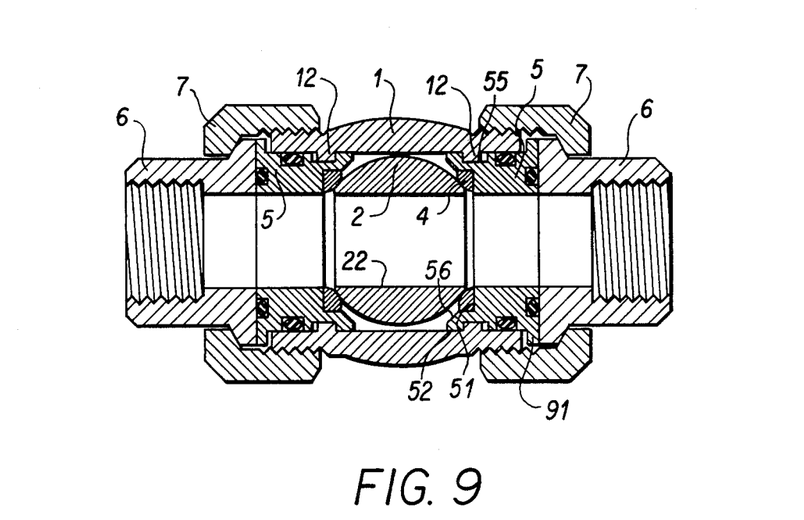
FIG. 9 is a horizontal cross-sectional view of the ball valve along IX—IX line in FIG. 8.
Figure 10:
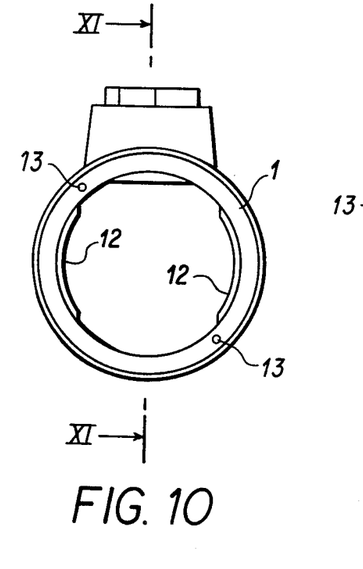
FIG. 10 is a side view of the valve body of the ball valve.
Figure 11:
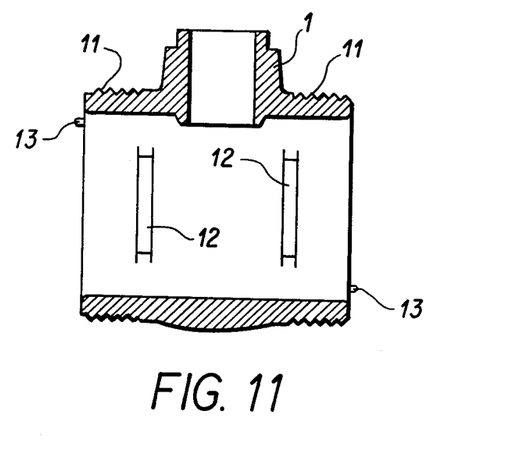
FIG. 11 is a cross-sectional view of the valve body along XI—XI line in FIG. 10.
Figure 12:
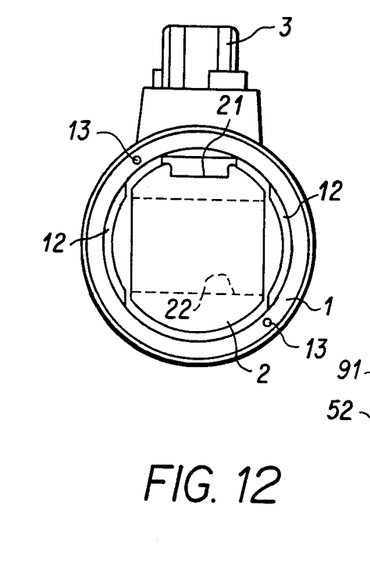
FIG. 12 is a side view of the valve body with a stem and ball.
Figure 13:
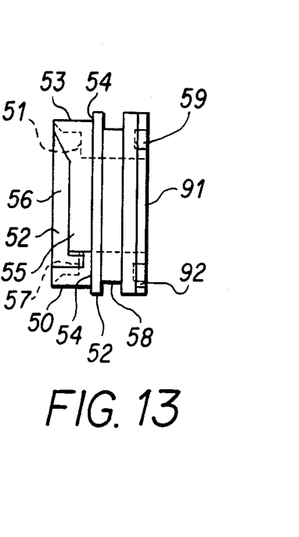
FIG. 13 is a plan view of a seat carrier.
Figure 14:
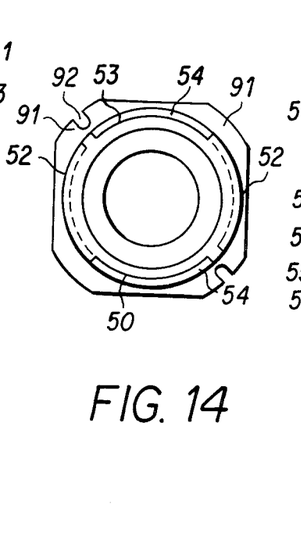
FIG. 14 a side view thereof.

As mentioned above, the ball valve in FIGS. 8-18 is characterized by flange 91 provided at the end of the seat carrier, and this can be seen from comparison of FIGS. 8-18 with FIGS. 1-7. Flange 91 is located on the outer end of the seat carrier 5 outside of valve body 1, opposed to the end surface of valve body 1. Flange 91 is provided with cavities 92 as seen in FIGS. 13 and 14. The valve body 1 is provided with projections 13 on the side surface opposite to the flange 91 as shown in FIGS. 10, 11, and 12. Flange 91 serves to rotate the seat carrier 5 to fix it to the valve body or to remove the seat carrier 5 from the valve body, and also to prevent the seat carrier 5 from coming out of the valve body by engagement of cavities 92 with projections 13.

More particularly, flange 91 extends outwardly in the radial direction at the end of seat carrier 5, as seen in FIG. 14. The shape of flange 91 is generally square with rounded corners. The square shape is for the convenience of inserting and rotating seat carrier 5 in the valve body. The rounded shape at the corners is for convenience of making it easy to cover the flange with the union nut and to provide the flange with cavities 92.

Figure 17:
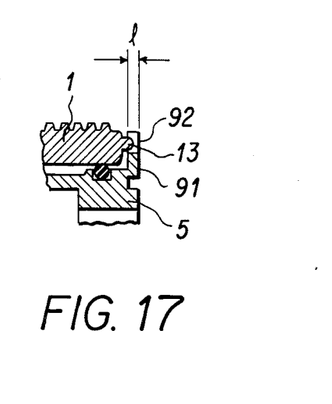
FIG. 17 is a sectional view of a portion of the valve along XVII—XVII line in FIG. 15.
Figure 18:
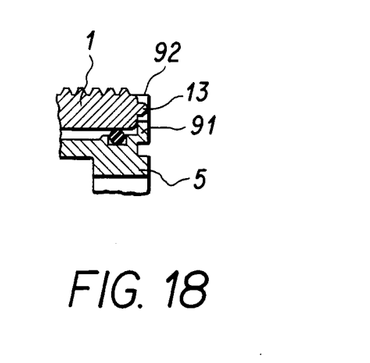
FIG. 18 is a sectional view of a portion of the valve in which the seat carrier is advanced deeply into the valve body.
Figure 19:
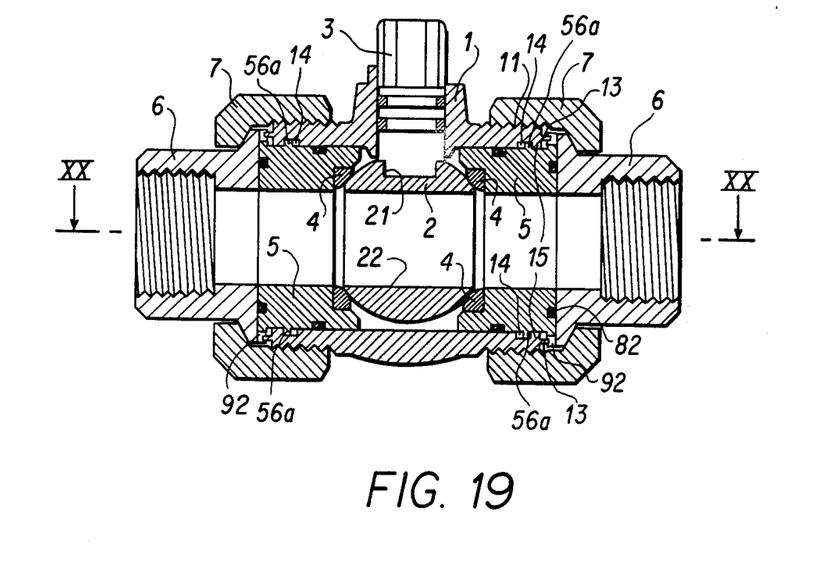
FIG. 19 is a vertical cross-sectional view of the ball valve.
Figure 20:
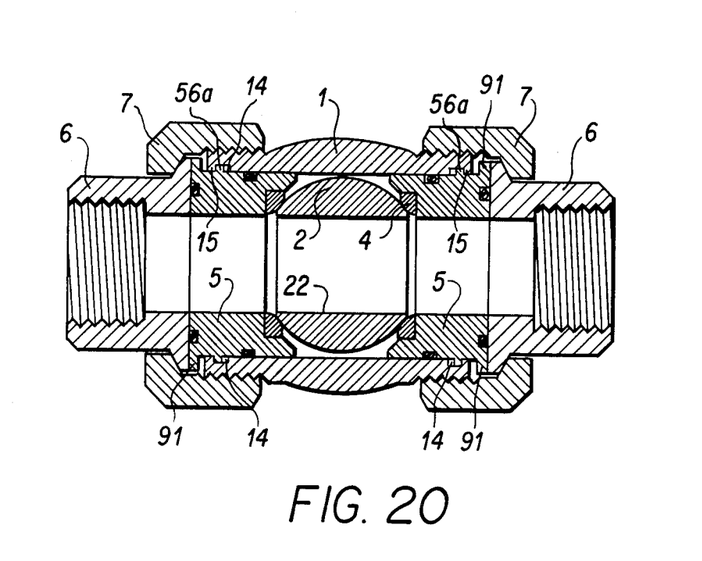
FIG. 20 is a horizontal cross-sectional view of the ball valve along XX—XX line in FIG. 19.
Figure 21:
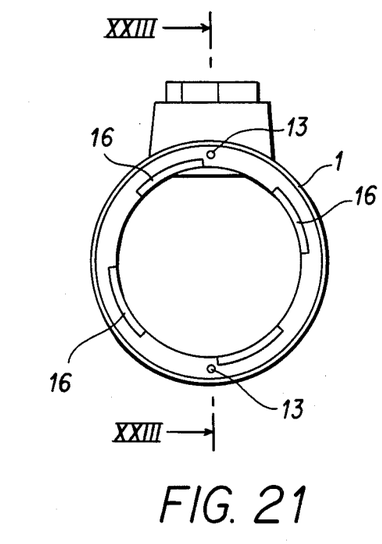
FIG. 21 is a side view of the valve body.
Figure 22:
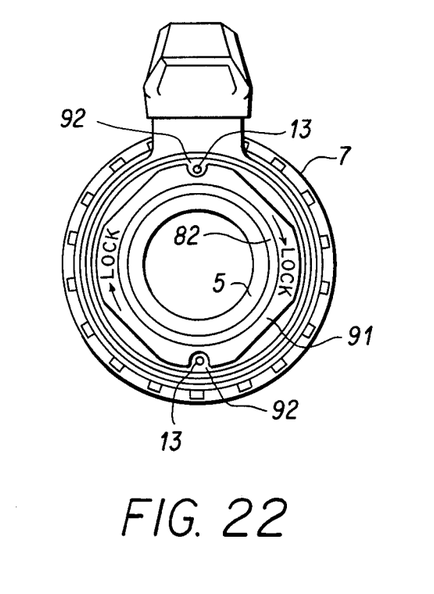
FIG. 22 is a side view of the valve body including a stem, ball and seat carrier on the valve body shown in FIG. 21.
Figure 23:
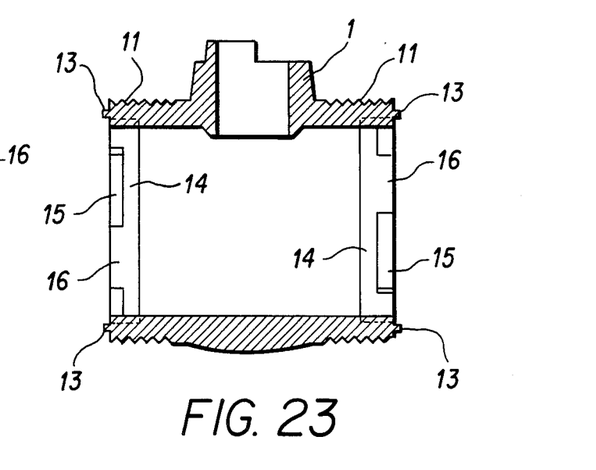
FIG. 23 is a cross-sectional view of the valve body along XXIII—XXIII line in FIG. 21.
Figure 24:
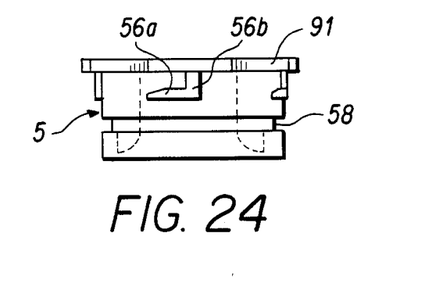
FIG. 24 is a plan view of the seat carrier.
Figure 25:
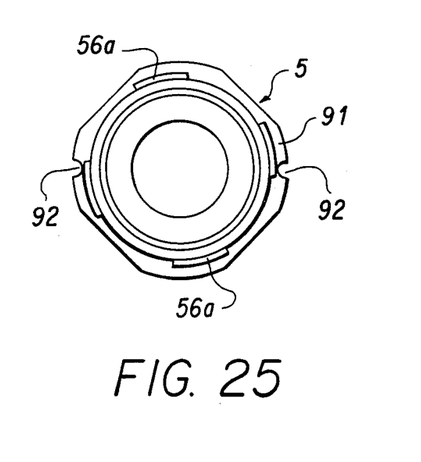
FIG. 25 is a side view thereof.

Flange 91 is slightly away from the side surface of valve body 1, as seen in FIG. 17, when the seat carrier 5 is initially rotated and fixed in the valve body immediately after having been inserted therein. This is closely connected with the relationship of the projections 12 biased in grooves 55 toward ball 2 to provide play on the end side of the valve body, as seen in FIG. 9. This is because, if flange 91 is away from the side surface of the valve body and projections 12 have play in grooves 55, then seat carrier 5 can be advanced toward ball 2, after ball seat 4 has been worn or abraded. Seat carrier 5 can be advanced without difficulty by tightening union nut 7. Thus, the leakage of fluid can be prevented without difficulty, if ball seat 4 has been abraded.

Flange 91 is provided with cavities 92 as shown in FIG. 14. Also, the end surface of the valve body is provided with projections 13 which are opposed to corresponding cavities 92. Cavities 92 are formed in a pair, at diametrically opposed positions on the flange surface, facing to the side of the valve body, and projections 13 are also formed on the end surface of the valve body in a diametrically opposed relation Further, the distance from the center to cavities 92 is rendered approximately equal to that from the center to projections 13, and the dimensions of cavities 92 are sufficient to receive projections 13. Therefore projections 13 can completely fit into cavities 92.

Flange 91 may be formed entirely around seat carrier 5, or may be partially around it. Flange 91 may be bent elastically by projections 13 and rotated over them until they are received in cavities 92. Projections 13 are preferably in the form of a post having a small height and a dome-like head, while, cavities 92 are preferably of the shape to receive projections 13 with some space remaining around them.

Cavities 92 and projections 13 are provided to be engaged when the seat carrier 5 is fixed to the valve body. More particularly, seat carrier 5 is inserted in the valve body until dogs 56 are advanced inwardly beyond projections 12, then rotated therein until stoppers 57 bump against the side surfaces of projections 12. The cavities 92 and projections 13 are formed on the surface of flange 91 and on the end surface of valve body 1, respectively at positions corresponding to the contact of stoppers 57 and projections 12.

In FIGS. 8-18, cavities 92 are formed on flange 91 and projections 13 on valve body, however, this relation may be reversed, and it may be possible that the projections are formed on the flange and the cavities are formed on the valve body. Further, it is not necessary that the cavities extend entirely through the flange, and the cavities may be merely indents.

In FIGS. 8-18, in order to fix seat carrier 5 in valve body 1, projections 12 are formed in the valve body and recesses 53 and grooves 55 are formed on the seat carrier, however, the reverse rotation preventing means using flange 91 is not limited to the ball valve having the projections and recesses in such a relation as illustrated in FIGS. 8-18. The reverse rotation preventing means using flange 91 may be applied to a ball valve in which the grooves are formed on the valve body and the projections are formed on the seat carrier, and further, to a ball valve in which the seat carrier is located only at one side of the ball.

FIGS. 19-25 show a further embodiment of a ball valve in which the valve body is provided with grooves, the seat carrier is provided with projections 56a, and the seat carrier is fixed to the valve body by engaging the grooves 14 with the projections 56a. The ball valve shown in FIGS. 19-25 is different from the ball valve shown in FIGS. 8-18 only in the mechanism in which the seat carrier 5 is fixed to the valve body 1, and both valves are the same in all other respects. Therefore, detailed descriptions of the same parts are omitted herein. The same numeral references are given to the corresponding portions, and explanations are made herein only on the different mechanism.

In FIGS. 19-25, grooves 14 are formed in valve body 1, as mentioned above. Particularly, grooves 14 are formed near the ends of valve body 1 and extend in the circumferential direction. Each of grooves 14 is connected with recesses 16, each of which extends in the axial direction to the end of valve body 1, for receiving the projections 56a. Projection 56b may be regarded as dogs. Four recesses 16 are aligned at an equal distance in the circumferential direction of valve body 1. As a result, four lips 15 are formed at each end of the valve body 1.

Four projections 56a are formed on seat carrier 5 at positions close to flange 91 and aligned at equal distances in the circumferential direction with the forward end of each projection extending in the circumferential direction, resulting in forming an L-shape. Extension of projections 56a in the cross-section of seat carrier 5 should be confined within the cross-sectional shape of recesses 16 in valve body 1. The forward part extending in the circumferential direction of projections 56a is a little narrower in the axial direction than grooves 14 in valve body 1. Therefore, if projections 56a are engaged with recesses 16, seat carrier 5 can be inserted in valve body 1, and if seat carrier 5 is thereafter rotated in the advancing direction of the forward part of projections 56a, the forward part advances along groove 14 in valve body 1, and base parts 56b of projections 56a bump against lips 15 to act as stoppers. Thus the seat carrier is prevented from further rotating, and accordingly, the seat carrier 5 is fixed to valve body 1 by lips 15.

Seat carrier 5 is provided with flange 91 at an end thereof, and flange 91 is further provided with cavities 92. Further, valve body 1 is provided with projections 13 on the side surface thereof Thus, projections 13 are fitted in cavities 92 and prevent seat carrier 5 from rotating backwards and thus, seat carrier 5 is fixed to valve body 1.

Figure 15:
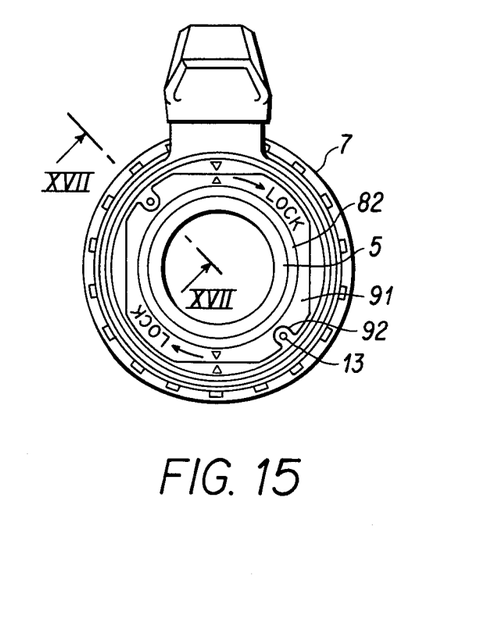
FIG. 15 is a side view of the ball valve shown in FIGS. 8 and 9 in a locked position, in which a union nut and connecting sleeve are removed and a handle is secured to the stem.
Figure 16:
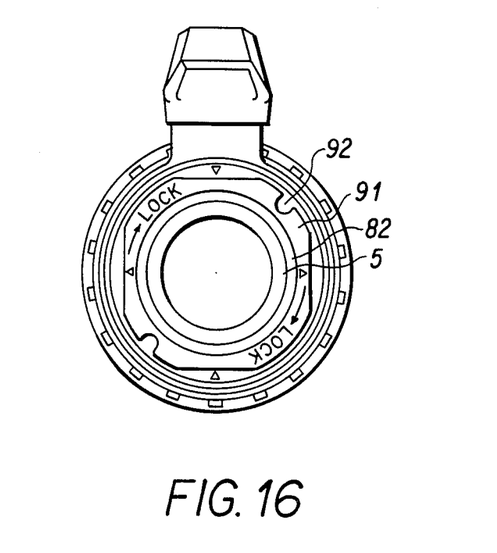
FIG. 16 is also a side view of the ball valve shown in FIG. 15 but in an unlocked position, in which a seat carrier is rotated backwards and is in a position ready to be removed.

Marks may be placed on flange 91 in order to facilitate and ensure insertion and rotation of seat carrier 5 in valve body 1, as illustrated in FIGS. 15 and 16. The marks for facilitating insertion are put on both the side surfaces of valve body 1 and the outer surface of flange 91 to indicate the positions at which recesses 53 (a small diameter portion) of the seat carrier 5 are aligned with projections 12 of valve body 1, and the marks are exemplified by little triangles in FIGS. 15 and 16. The marks for indicating the rotating direction of seat carrier 5 are placed on flange 91 and are exemplified by arrows in FIGS. 15 and 16.

When flange 91 is provided to prevent seat carrier 5 from rotating in the reverse direction, seat carrier 5 may be designed to advance progressively inwardly into valve body 1 as it is rotated. In particular, seat carrier 5 may be advanced progressively deep into valve body 1 as it is rotated by providing the side surface of the groove with an inclination in a spiral form. Further, when projections 12 are extended to some degree in the circumferential direction of valve body 1, seat carrier 5 may be advanced inwardly by inclining the side surface of projections 12 in a spiral form instead of inclining the side surface of the groove. The reverse rotation preventing means prevents seat carrier 5 from rotating in the backwards direction, even if the surfaces are inclined.

According to the invention, as between the seat carrier and valve body, one is provided with at least two projections on the surface to be contacted with the other, and the other is provided with the recesses and grooves corresponding to the projections. The recesses extend from one end of the other in the axial direction thereof, the forward ends of the recesses communicating with the grooves extending in the circumferential direction. Therefore, the seat carrier can be inserted in the valve body by aligning the projections with the recesses and advancing the seat carrier and then rotating the seat carrier until the projections are in the grooves. Further, the seat carrier can be held in the valve body such that the seat carrier can be slightly moved in the axial direction thereof. Further, the seat carrier is provided with a flange at the other end in the axial direction thereof, with the flange opposed to one end surface of the valve body. One of the opposing surfaces of the flange and the valve body is provided with projections and the other with corresponding cavities or indents. By engaging the projections with the cavities or indents, the seat carrier can be prevented from rotating in the reverse direction and coming out of the valve body even if the union nut is rotated in the reverse direction. As a result, pipes connected downstream of the valve can be removed and repaired by removing the union nut and then the connecting sleeve while the fluid pressure is still applied in the ball valve. Furthermore, the invention brings out the same effects as those of the first embodiment and brings about the advantages as mentioned above.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein

We claim:
1. A ball valve comprising:
a valve body formed from a tubular member with a cylindrical hole extending therethrough;
a stem having one end thereof projecting into the hole;
a ball fixed to an end of the stem, the ball having a circular bore extending diametrically therethrough, the ball being spherical in shape with removed chordal segments corresponding to the bore;
a seat carrier inserted in the hole, the seat carrier having a first end adjacent the ball;
a connecting sleeve contacting a second end of the carrier opposite the first end adjacent the ball;
a union nut for coupling the connecting sleeve to the valve body;
at least two first projections formed integrally with an inner surface of the valve body on a wall of the hole in the valve body, the first projections being located diametrically opposed on a line perpendicular to the stem axis, each of the first projections extending into the hole to have a height in a radial direction less than that of the removed chordal segments formed by the circular bore in the ball;
recesses formed on the side of the seat carrier adjacent the first end thereof in a diametrically opposed relation;
grooves formed in the side of the seat carrier adjacent the recesses, the grooves extending in the circumferential direction from the adjacent recess; and
a flange formed on the second end of the seat carrier wherein one of the flange and valve body includes at least one second projection and the other of the flange and valve body includes at least one cavity, and wherein the second projection is engaged in the cavity to prevent the rotation of the seat carrier with respect to the valve body.

2. A ball valve according to claim 1, wherein the width of the grooves is larger than width of the first projections, the first projections are biased in the grooves towards the ball, and the face of the flange facing the end surface of the valve body does not contact the valve body.

3. The ball valve according to claim 1 or 2, wherein the valve body is made of a hard thermoplastic resin.

* * * * *